(12) United States Patent
Patel (10) Patent No.: US 10,124,649 B2
(45) Date of Patent: Nov. 13, 2018

(54) AUXILIARY HEATING SYSTEM FOR VEHICLES

(71) Applicant: FORD GLOBAL TECHNOLOGIES, LLC, Dearborn, MI (US)

(72) Inventor: Upendra J. Patel, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 1208 days.

(21) Appl. No.: 14/254,148

(22) Filed: Apr. 16, 2014

(65) Prior Publication Data

US 2015/0298523 A1    Oct. 22, 2015

(51) Int. Cl.
*B60H 1/22* (2006.01)
*B60H 1/00* (2006.01)

(52) U.S. Cl.
CPC ..... *B60H 1/00778* (2013.01); *B60H 1/00878* (2013.01); *B60H 1/00964* (2013.01); *B60H 1/2206* (2013.01); *B60H 1/2218* (2013.01); *B60H 2001/2234* (2013.01); *B60H 2001/2237* (2013.01)

(58) Field of Classification Search
CPC ............ B60H 1/00778; B60H 1/00878; B60H 1/00964; B60H 1/2206; B60H 1/2218; B60H 2001/2234; B60H 2001/2237
USPC ....................................... 237/2 A, 12.3 R, 81
See application file for complete search history.

(56) References Cited

U.S. PATENT DOCUMENTS

| | | | | |
|---|---|---|---|---|
| 4,847,468 A | * | 7/1989 | Hufstetler | .......... B60H 1/00264 165/41 |
| 5,063,513 A | | 11/1991 | Shank et al. | |
| 5,632,443 A | | 5/1997 | Quarrie | |
| 5,796,332 A | | 8/1998 | Steiert | |
| 5,831,514 A | | 11/1998 | Hilpert et al. | |
| 6,076,593 A | | 6/2000 | Takagi et al. | |
| 6,158,225 A | * | 12/2000 | Muto | ................. B60H 1/00478 62/235.1 |

(Continued)

FOREIGN PATENT DOCUMENTS

| | | | | |
|---|---|---|---|---|
| DE | 102007004765 A1 | * | 8/2008 | ......... B60H 1/00778 |
| JP | 2002067668 A | * | 3/2002 | ......... B60H 1/00778 |

(Continued)

OTHER PUBLICATIONS

Ford MONDEO Owner's Manual, 2012, pp. 114-118.

*Primary Examiner* — Gregory Huson
*Assistant Examiner* — Daniel R Namay
(74) *Attorney, Agent, or Firm* — Vichit Chea; MacMillan, Sobanski & Todd, LLC (57) ABSTRACT

An auxiliary heating system for a vehicle interacts with an ignition controller having a Run state in which an engine of the vehicle is running and an Off state in which the engine is not running. An auxiliary heater has a Parking mode for heating a passenger cabin of the vehicle when the ignition controller is in the Off state. An auxiliary heater controller has a user-configurable setting for selectably entering the Parking mode when the ignition controller enters the Off state. A manual interface is responsive to a user to provide user commands to the auxiliary heater controller including setting commands during the Run state for determining the user-configurable setting and a cancel command during the Off state for terminating the Parking mode.

20 Claims, 5 Drawing Sheets

(56) References Cited

U.S. PATENT DOCUMENTS

| | | | | |
|---|---|---|---|---|
| 6,874,695 B2* | 4/2005 | Baker | | B60H 1/02 |
| | | | | 165/41 |
| 7,027,912 B1* | 4/2006 | Metzger | | B60H 1/00778 |
| | | | | 123/179.4 |
| 8,409,055 B2* | 4/2013 | Gooden | | F01M 5/001 |
| | | | | 165/41 |
| 8,424,776 B2* | 4/2013 | Veettil | | B60H 1/3226 |
| | | | | 237/12.3 A |
| 8,966,913 B2* | 3/2015 | Oh | | B60H 1/00428 |
| | | | | 62/187 |
| 9,222,710 B2* | 12/2015 | Katayama | | B60H 1/00921 |
| 2002/0046831 A1* | 4/2002 | Humburg | | B60H 1/2209 |
| | | | | 165/202 |
| 2004/0231832 A1* | 11/2004 | Schlecht | | B60H 1/00849 |
| | | | | 165/202 |
| 2007/0245755 A1* | 10/2007 | Galvez-Ramos | | |
| | | | | B60H 1/00428 |
| | | | | 62/235.1 |
| 2007/0272187 A1* | 11/2007 | Celisse | | F02N 11/0833 |
| | | | | 123/179.4 |
| 2008/0134715 A1* | 6/2008 | Lewis | | B60H 1/2209 |
| | | | | 62/498 |
| 2010/0100306 A1* | 4/2010 | Gamache | | F02N 11/0803 |
| | | | | 701/113 |
| 2011/0114741 A1 | 5/2011 | Kaindl | | |
| 2011/0139882 A1 | 6/2011 | Kaindl et al. | | |
| 2011/0251019 A1* | 10/2011 | Ulrey | | B60H 1/00314 |
| | | | | 477/98 |
| 2012/0318489 A1* | 12/2012 | Harry | | B60H 1/00828 |
| | | | | 165/200 |
| 2013/0317728 A1* | 11/2013 | Hall | | B60H 1/00778 |
| | | | | 701/113 |
| 2014/0121900 A1* | 5/2014 | Graubmann | | B60H 1/00778 |
| | | | | 701/36 |
| 2014/0353392 A1* | 12/2014 | Park | | B60H 1/00885 |
| | | | | 237/12.3 B |
| 2015/0219061 A1* | 8/2015 | Braun | | F02N 19/02 |
| | | | | 237/12 |
| 2015/0283879 A1* | 10/2015 | Tjandra | | B60H 1/00778 |
| | | | | 165/202 |
| 2015/0360535 A1* | 12/2015 | Quix | | B60H 1/00492 |
| | | | | 237/8 A |
| 2016/0075210 A1* | 3/2016 | Quaranta-Guido | | B60Q 9/00 |
| | | | | 701/48 |
| 2016/0207374 A1* | 7/2016 | Gauthier | | B60H 1/00742 |
| 2016/0207375 A1* | 7/2016 | Gauthier | | B60H 1/00778 |
| 2016/0368345 A1* | 12/2016 | Farooq | | B60H 1/00771 |
| 2017/0008375 A1* | 1/2017 | Blatchley | | B60H 1/2218 |
| 2017/0094605 A1* | 3/2017 | Dalke | | H04W 52/0274 |
| 2017/0124873 A1* | 5/2017 | Semsey | | G01C 21/3685 |
| 2017/0129425 A1* | 5/2017 | Dalke | | H04L 61/2015 |

FOREIGN PATENT DOCUMENTS

| | | | | |
|---|---|---|---|---|
| JP | 2004123011 A | * | 4/2004 | ......... B60H 1/00778 |
| JP | 2012046163 A | * | 3/2012 | ......... B60H 1/00778 |

* cited by examiner

AUXILIARY HEATING SYSTEM FOR VEHICLES

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to heating of the passenger cabin in motor vehicles, and, more specifically, to operation of an auxiliary heater during times that an internal combustion engine of the vehicle is off.

In order to provide passenger comfort and to maintain the windows free of ice and condensation, motor vehicles are provided with heaters to provide heat to the passenger cabin. The primary source of heat is usually waste heat from operating an internal combustion engine, wherein liquid coolant circulating through the engine is passed through a heater core which exchanges waste heat into the passenger cabin. In order to precondition the cabin and clear the windows during cold weather, a remote start capability has been provided to allow the user to start the internal combustion engine before arriving at or entering the vehicle. However, running the internal combustion engine only for supplying interior heat is not the most energy-efficient way to heat the cabin. Furthermore, prolonged idling of an engine while a vehicle is parked is sometimes prohibited by law.

As a result, auxiliary heaters (also called parking heaters) have come to be used that operate independently of the combustion engine using either combustible fuel and/or stored electricity as an energy source. Typically, the auxiliary heater is coupled to the engine coolant circuit in order to share the coolant for distributing the generated heat. Coolant may sometimes be circulated using an auxiliary pump (not depending upon engine operation). Coolant is heated in the auxiliary heater and flows to a heater core where it releases the heat into an air flow to the passenger cabin. An example of a parking heater utilizing the fuel supply of the combustion engine is the Thermo Top Evo parking heater from Webasto Thermal and Comfort SE of Gilching, Germany.

The parking heater function has typically been activated by a manual switch (a Human Machine Interface, or HMI, setting) in the vehicle interior, by remote control, or by use of a preprogrammed timer. Conventional parking heater controls, however, have not been well adapted to certain usage patterns of particular users. Furthermore, limitations of conventional user interfaces have resulted in customer dissatisfaction.

More specifically, some drivers (e.g., delivery drivers) may operate a vehicle by making frequent stops and starts along a route. So that the vehicle and its contents remain secure while the driver is away from the vehicle to deliver a package inside a building, for example, the driver shuts off the ignition switch and removes the ignition key. Even if the ignition key is not removed, the delivery driver may be required by regulations to shut down the engine while being parked to deliver a package. If the driver desires to maintain cabin heating while away, it has been necessary to perform a control sequence using either interior control switches or a remote control to activate the parking heater. Thus, it becomes cumbersome for the driver to maintain cabin heating during frequent stops.

Similarly, any driver who arrives early at their destination may want to remain in the parked vehicle for a while without exiting. It may also be desired (or required) to shut down the engine during their wait time. The conventional ignition switch includes an Accessory position which can be used to shut down the engine while continuing to use certain electrical accessories in the vehicle such as a radio. But since the engine is shut down, only the air blower function of the climate control system is usually available with the ignition control in the Accessory position. If the driver wants to obtain interior heating as they wait, convention control interfaces have required manual control actions for every occurrence. It would be desirable to allow the driver to shut down the engine while continuing to obtain parking heat without always have having to initiate such a function.

Operation of the parking heater normally depends on certain conditions being present. For example, the heater should only operate if there is at least a threshold amount of fuel in the fuel tank and the ambient temperature is below a certain temperature. Electrical energy is used even for a fuel-based auxiliary heater in order to run an auxiliary coolant pump. Therefore, heater operation may also depend on a battery state of charge being greater than a predetermined minimum Proper combustion in a fuel-based heater may depend on maintaining a level orientation of the combustion unit, so that operation cannot be permitted with the vehicle on an extreme grade. In addition, the manufacturer typically defines a maximum duration for which the parking heater may operate without the combustion engine being restarted. In view of this conditional operation, a user's attempt with a wireless remote to preheat the cabin with the auxiliary heater function might be unsuccessful due to insufficient fuel, a high ambient temperature, being parked on an excessive grade, or other reasons. However, since the user may not be aware of the potential causes for a failed operation, they may be very dissatisfied when they discover that the cabin has not been preheated and may assume that their vehicle is defective.

In connection with preprogrammed activation times for the parking heater, difficulties may arise when a particular vehicle is driven by more than one person. For example, one user may configure an automatic pre-heating operation for a certain day and time, but then the vehicle is driven by a second user on the preprogrammed day without knowledge of the preprogrammed settings of the auxiliary heater. Unexpected heater operation can thus occur, which may be disconcerting for the second user. Furthermore, byproducts of combustion from the parking heater may be unintentionally released in an enclosed space since the second user could not anticipate the action of the heater. Moreover, since the second user may not desire to have an automatic operation at the preprogrammed time there may be unwant battery drain and fuel use.

SUMMARY OF THE INVENTION

In one aspect of the invention, a vehicle comprises an ignition controller with a Run state in which an engine of the vehicle is running and an Off state in which the engine is not running. An auxiliary heater has a Parking mode for heating a passenger cabin of the vehicle when the ignition controller is in the Off state. An auxiliary heater controller has a user-configurable setting for selectably entering the Parking mode when the ignition controller enters the Off state. A manual interface is responsive to a user to provide user commands to the auxiliary heater controller including setting commands during the Run state for determining the user-configurable setting and a cancel command during the Off state for terminating the Parking mode.

DETAILED DESCRIPTION OF PREFERRED EMBODIMENTS

Figure 1:
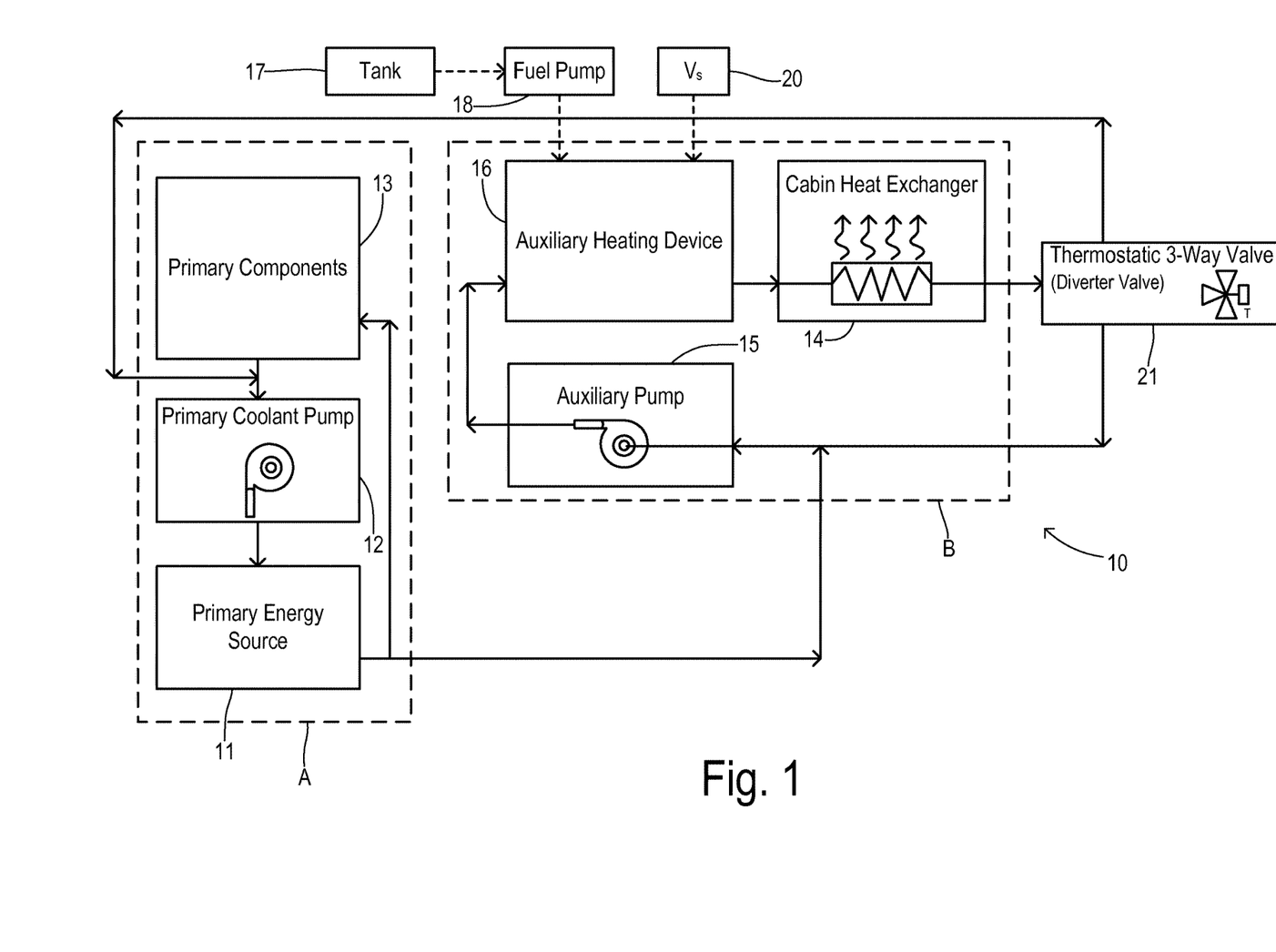
FIG. 1 is a block diagram showing one embodiment of a coolant circuit useful in the present invention.

Referring to FIG. 1, a motor vehicle includes a coolant circuit 10 capable of various flow patterns (i.e., loops) depending on the whether an internal combustion engine is operating, whether cabin heating is desired, and other factors. Of course, the present invention could use many other architectures for a coolant circuit that provide for auxiliary heating of the passenger cabin. In this example, loop A circulates coolant within a primary energy source (e.g., internal combustion engine) 11, a primary coolant pump 12, and primary cooling system components 13 (such as a radiator, deaerator, transmission or engine oil coolers or heaters, an EGR cooler, and/or heat exchange components associated with a turbocharger).

Loop B circulates coolant among a cabin heat exchanger 14, auxiliary pump 15, and an auxiliary heating device 16. In a preferred embodiment, auxiliary heater 16 may comprise a fuel-based heater using fuel from a tank 17 via a fuel pump 18. Auxiliary heater 16 could also be comprised of a PTC electric heater receiving power from a battery 20 which supplies a voltage $V_s$. Battery 20 may also provide power for operating auxiliary pump 15 as known in the art.

A thermostatic three-way valve 21 is positioned to control coolant flow between loop A and loop B. The loops can be isolated to provide rapid warming of the passenger cabin by auxiliary heater 16, for example. As coolant temperature rises above a setpoint, valve 21 changes state in order to pass coolant through both loops so that engine 11 may also be preheated.

Figure 2:
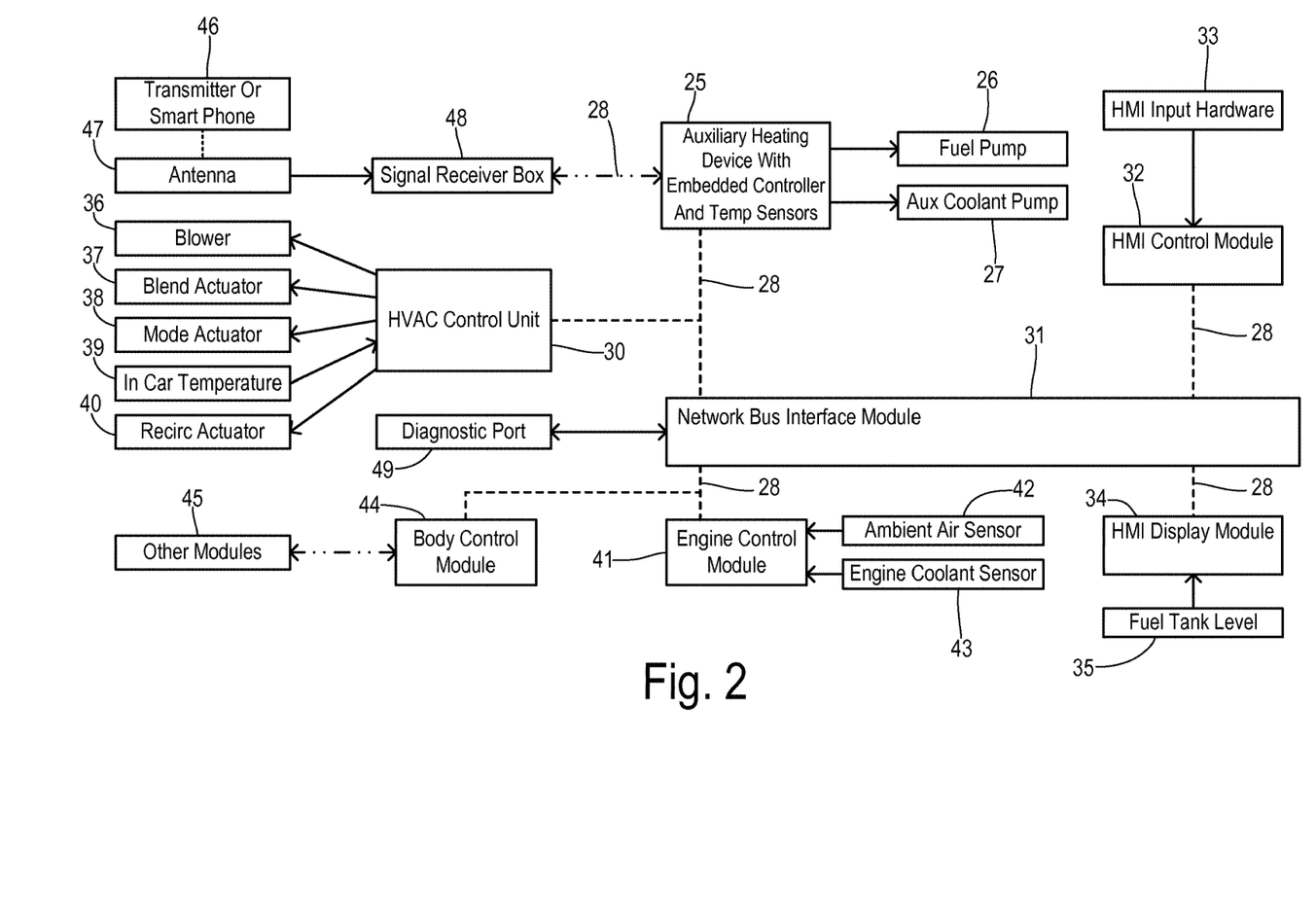
FIG. 2 is a electrical block diagram showing one embodiment of the invention.

FIG. 2 shows an example electrical architecture for implementing the present invention in a vehicle. An auxiliary heating device 25 is provided having an embedded controller and temperature sensors, as is common in commercially available devices. Heating device 25 is coupled to a fuel pump 26 to activate the fuel supply when necessary for auxiliary heating. Likewise, heating device 25 is coupled to an auxiliary coolant pump 27 in order to distribute the generated heat to the passenger cabin.

A network multiplex bus 28 may have several segments for interconnecting various electronic modules. Thus, auxiliary heating device 25 is coupled via bus 28 to an HVAC control unit 30. Auxiliary heating device 25 may be further coupled to various electronic modules via a network bus interface module 31 and other segments of bus 28. In particular, heating device 25 may operate in conjunction with an HMI control module 32 and an HMI display module 34 via network bus interface module 31. HMI control module 32 is connected to input hardware 33 such as a steering wheel mounted multifunction switch. HMI display module 34 preferably includes an illuminated display for presenting various messages to a user. A fuel tank level sensor 35 is coupled to display module 34 for displaying a fuel level to the user and to provide a fuel level signal to auxiliary heating device 25.

HVAC control unit 30 is coupled to a blower 36, a blend actuator door mechanism 37, an air circulation mode actuator 38, an in-car temperature sensor 39, and a fresh/recirculation actuator 40. HVAC unit 30 preferably has an integrated HMI or communicates with HMI module 32 so that the user can specify a setpoint temperature, a blower speed, and other variables for the HVAC system.

Auxiliary heating device 25 interacts via the network bus interface module 31 with an engine control module 41. An ambient air sensor 42 provides an ambient temperature measurement to engine control module 41, which transmits the measurement to heating device 25. Similarly, an engine coolant sensor 43 provides an engine coolant temperature signal that is also transmitted to heating device 25.

Auxiliary heating device 25 may be further coupled to a body control module 44 and/or other modules 45 to provide other sensor signals such as an inclination sensor providing a tilt angle of a parked vehicle. Furthermore, a diagnostic port 49 may be coupled to the network bus interface module 31.

In addition to the vehicle interior HMI controls, auxiliary heating device 25 can be remotely controlled using a wireless transmitter or smart phone 46 via a vehicle mounted antenna 47 and a signal receiver box 48, thereby allowing a user to remotely initiate preheating of the vehicle. Auxiliary heating device 25 can also be controlled according to pre-scheduled activation times as known in the art.

In order to adapt operation of the auxiliary heater to various other types of vehicle usage, the present invention provides the user with a pre-selectable option to automatically continue heating of the passenger cabin when the vehicle engine is turned off. This option may be a one-time occurrence or maybe a recurring setting. By providing this pre-selectable option, the user is relieved from the burden of remembering to trigger the auxiliary heater when turning the engine off. In the prior art, turning off the engine has resulted in immediate shutting down of all heating devices. Reactivation of a fuel operated auxiliary heater can take several minutes, which could allow significant undesired cooling of the cabin air.

Figure 3:
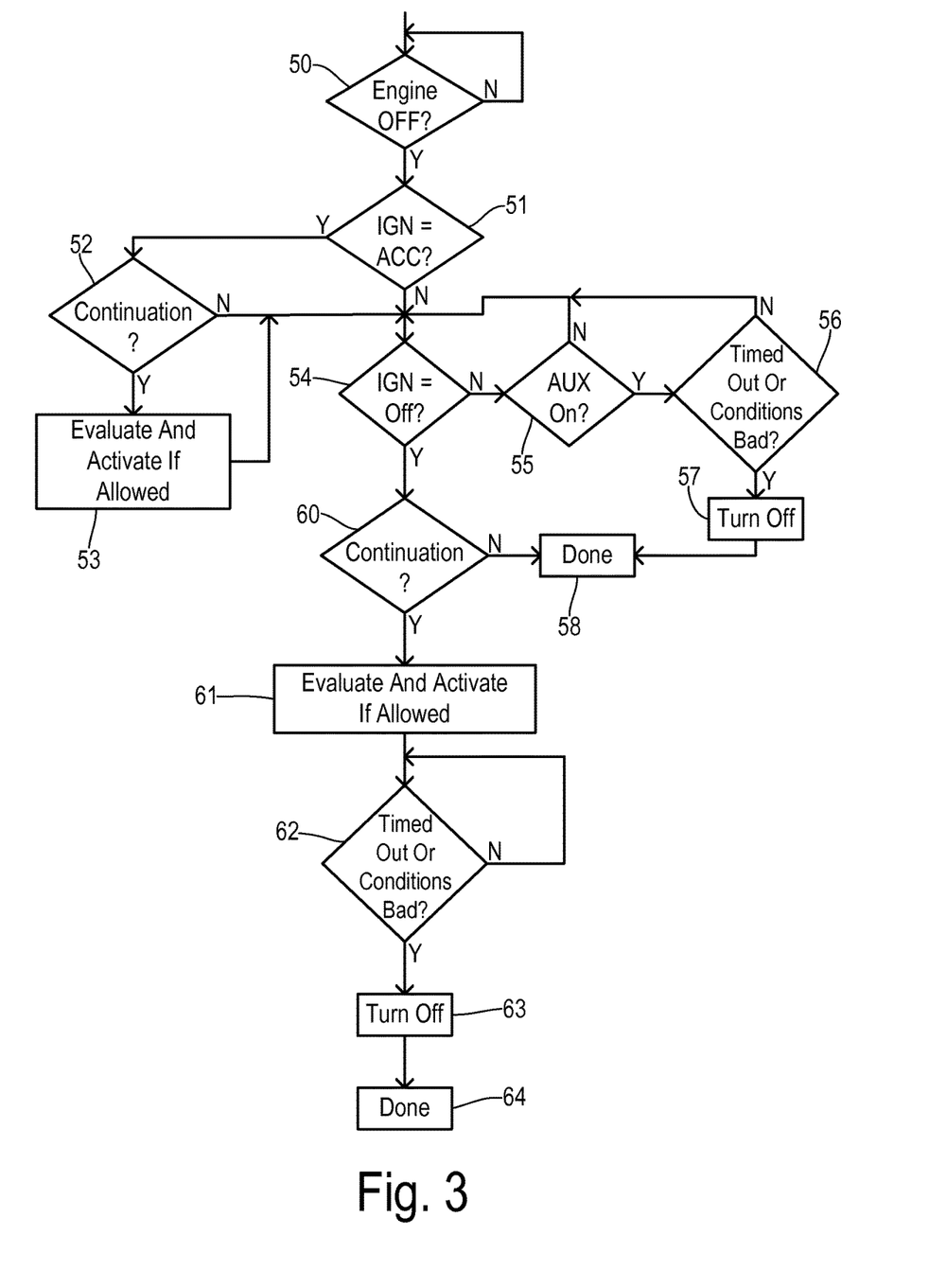
FIG. 3 is a flowchart showing one preferred method of the invention.

A preferred embodiment of a method for performing the present invention is shown in FIG. 3. In step 50, a check is performed to determine if the engine has been turned off. Once the engine has been turned off, then a check is performed in step 51 to determine whether the ignition switch has been placed in the Accessory position (e.g., checking whether the ignition switch remains in the Accessory position for at least several seconds). The reason for checking for an Accessory position is to allow a user who remains in the vehicle (with the key in the ignition) to have access to additional electronic controls during auxiliary heater operation, such as modifying the setpoint temperature for the auxiliary heater, setting the blower speed, and changing the air circulation mode.

As used herein, "continuation" of auxiliary heating means to enter a Parking mode. The Parking mode may include either a continued activation when the auxiliary heater is already operating at the time the engine turns off or a turning on of the auxiliary heater which is not already operating at that time (assuming other vehicle conditions allow auxiliary heater operation). A single user-configured setting can be used to control both continued activation regardless of whether the ignition switch is placed in the Accessory position or the Off position. Alternatively, separate settings may be provided to control availability of the option in the Accessory position and the Off position.

If the Accessory position is detected in step 51, then a check is performed in step 52 to determine whether the user has activated the continuation option. If so then the auxiliary heating device evaluates the current vehicle conditions and performs a continuation of the auxiliary heater function (i.e., puts the auxiliary heater into the Parking mode) if vehicle conditions allow, in step 53. Conditional activation may be dependent on available energy for powering the auxiliary heater (e.g., sufficient fuel in the fuel tank and/or sufficient battery state of charge), detection of a sufficiently cold ambient air temperature, and detection of a level surface.

In the event that the Accessory position is not detected in step 51 or the auxiliary heater has been placed into continued operation in step 53, then a check is performed in step 54 to determine whether the ignition has been moved to the Off position. If not yet in the Off position, then a check is performed in step 55 to determine whether auxiliary heater operation is already in the Parking mode, and if so then a check is performed in step 56 to determine whether a maximum allowed duration for auxiliary heater operation has been reached or whether any of the required conditions for operation have gone bad (e.g., the battery state of charge has fallen below a threshold). If timed out or a bad condition is detected, then the auxiliary heater is turned off in step 57 and the method is done at step 58. Otherwise, the method returns to step 54 to continue checking for movement of the ignition switch to the Off position.

Once the ignition switch moves to the Off position, a check is performed in step 60 to determine whether the user has enabled automatic continuation of the Parking mode. If not, then the method is done at step 58. If enabled, then the auxiliary heating device evaluates the appropriate conditions and activates or continues activation of the auxiliary heating function if allowed in step 61. While in the Parking mode, the auxiliary heater controller periodically checks for a time out or a change in the conditions of operation in step 62. Once timed out or the conditions for operations are no longer satisfied, then the auxiliary heating device is turned off in step 63 and the method is completed at step 64.

Figure 4:
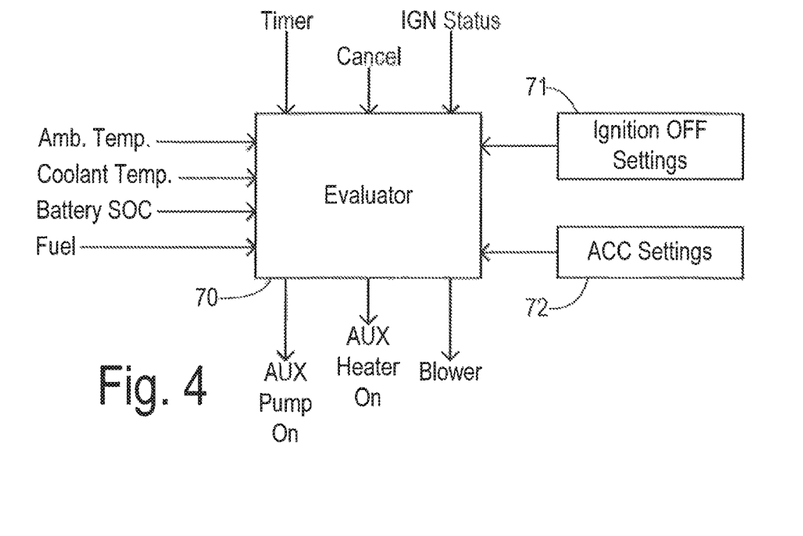
FIG. 4 is a block diagram showing a portion of an auxiliary heater control.

FIG. 4 shows an evaluator circuit 70 within the auxiliary heater controller that determines whether the Parking mode for the auxiliary heater should be automatically entered. Evaluator circuit 70 receives an ignition status signal, an ambient air temperature signal, a coolant temperature signal, a battery state of charge signal, and a fuel level signal. The auxiliary heater controller or another module in the vehicle stores user-configured ignition OFF settings 71. Settings 71 are provided to evaluator circuit 70 to control activation of the Parking mode. A separate set of ACC settings 72 may also be provided if desired. When the ignition status signal transitions from a Run position to the Accessory or Off position, evaluator circuit 70 checks the settings 71 or 72 to determine whether automatic continuation of auxiliary heat-ing is desired by the user. When the user has enabled the function, then the evaluator circuit 70 checks fuel, battery, and temperature conditions (among others) to determine whether the Parking mode is available. If so, then evaluator circuit 70 provides appropriate commands to an auxiliary pump and auxiliary heater to turn them on. Additional commands such as a blower signal may be provided to the HVAC control module for appropriate activation. During activation of the Parking mode, evaluator circuit 70 monitors a timer signal to limit the duration of heater operation. It also monitors for a cancel signal as described in more detail below.

Figure 5:
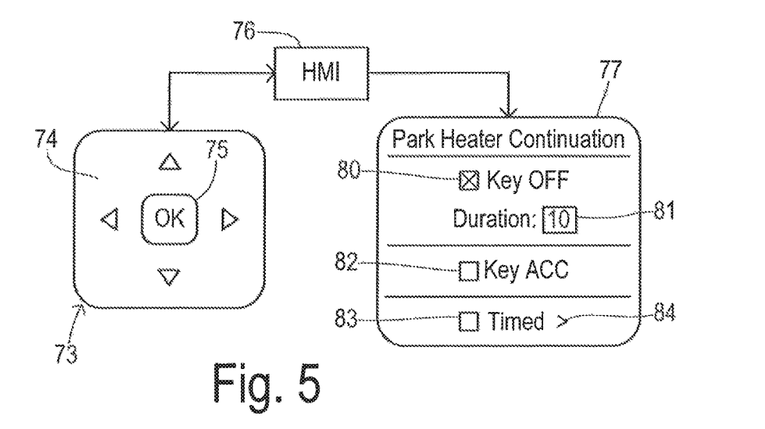
FIG. 5 illustrates an input device and message display during a set-up mode for one embodiment of the invention.

One preferred system for user configuration of the automatic auxiliary heating continuation function is shown in FIG. 5. A manual interface includes a multifunction switch 73 with directional (e.g., rocker) pushbutton switches 74 disposed around a selection (e.g., "OK") button 75. Multifunction switch 73 is coupled to an HMI controller 76 which is further coupled with a message display 77. As is known in the art, a user can navigate various configuration menus shown on message display 77 by manipulating multifunction switch 73. As shown in FIG. 5, a parking heater configuration screen is shown with a selection box 80 corresponding to a "Key Off" auxiliary heater continuation feature. By using directional switches 74 to highlight box 80 and using selection button 75 to toggle the function on and off, the user makes their selection. A duration window 81 may be similarly adjusted if the user wishes to alter the maximum operation time of the auxiliary heater (e.g., up to some predefined maximum duration).

In a preferred embodiment, by selecting "Key Off" box 80 a setting is initiated corresponding to a repeating automatic Parking mode activation with every key Off event. Alternatively, an additional selection box (not shown) can be provided for toggling between a repeating command and a "one time" activation command. If desired, another selection box 82 may be provided to allow the user to choose a "Key Accessory" continuation function. As in some prior art systems, a "Timed" selection box 83 may be provided. When selection box 83 is checked, a right arrow icon 84 may be shown to indicate to the user that selection of the right arrow on rocker switches 74 will navigate to a time setting menu screen.

Figure 6:
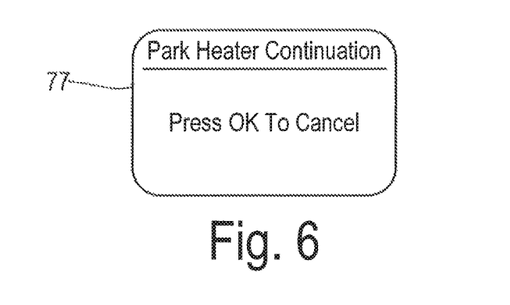
FIG. 6 shows a message display displaying a cancellation message while a Parking mode.

Once the Parking mode has been entered and the ignition key is removed from the ignition switch, auxiliary heater operation will continue even though the driver may leave the vicinity of the vehicle. In conventional vehicles with a parking heater function, turning off the auxiliary heater has required use of a remote transmitter which is authorized to access the system or else the user has been required to use the ignition key in order to activate the HMI controls that may then be used to deactivate the auxiliary heater. In some instances, the remote transmitter and/or the ignition key may be unavailable at a time when it is desired to shut down the auxiliary heater. For example, the driver may move away from the vehicle while a second occupant remains in the vehicle. In order to conserve fuel, minimize ecological impact, preserve battery life, reducing noise emissions, or just because heating is no longer desired, the remaining user may wish to deactivate the auxiliary heater. Even for a driver who does have the ignition key or remote transmitter available, it would be desirable to easily and rapidly turn off the auxiliary heating device on demand. Therefore, the present invention maintains at least limited operation of the HMI in order to facilitate shutting down the auxiliary heater. Preferably, a message is displayed on message display 77 during the parking mode, as shown in FIG. 6. Thus, a message stating "Press OK to Cancel" informs a vehicle occupant that pressing the selection button will have the effect of turning off the auxiliary heating device. If necessary, the cancellation message can be displayed in a cycling manner along with any other ignition-off messages being displayed by other vehicle systems. If the user presses the selection button to cancel the parking mode, an acknowledgment message may then be shown to confirm the deactivation if desired. If so equipped, voice command inputs and/or audio output messages can be used with or instead of the visual messages.

Figure 7:
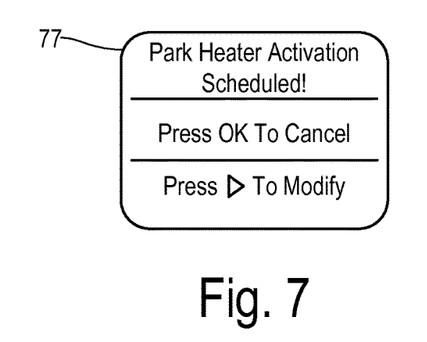
FIG. 7 shows a message display displaying a scheduling message while a driver is shutting off a vehicle.

As previously described, a vehicle user may not be aware that someone else has preprogrammed an auxiliary heater operation on a set schedule. For example, a is first user may set-up timed activations at a recurring day of the week and time of day, and then the vehicle may be borrowed by a second user. The present invention notifies the second user of an upcoming preprogrammed activation event by showing a display on the message display 77 as shown in FIG. 7. Such a message may be shown in response to the turning off of the ignition switch and/or the opening of the driver door, for example. The message informing the driver that a Parking mode activation is scheduled would preferably be shown any time when there is an upcoming event, since it would not be known for how long the second user may be leaving the vehicle in a location where an automatic activation is undesirable. The message may also serve as a useful reminder to the user who created the preprogrammed event. In order to facilitate cancellation or modification of an upcoming event, message display 77 preferably includes instructions for walking the user through a cancellation message menu and a modification menu as shown.

Figure 8:
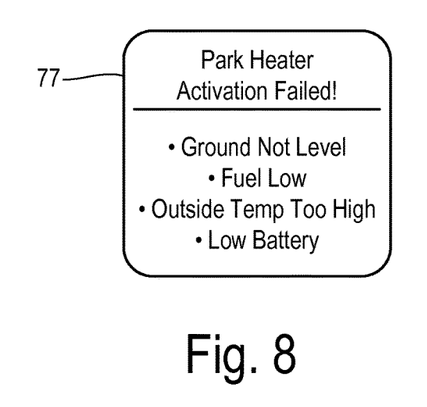
FIG. 8 shows a message display displaying an activation failure message.

FIG. 8 shows a further use of message display 77 to provide user feedback whenever an attempted remote activation of the parking heater function has failed. Thus, whenever a remote activation command is received and operation of the auxiliary heater is prevented due to failure of one or more of the operating conditions, then a message as shown in FIG. 8 can be shown upon entry of a user into the vehicle. Thus, when the driver door opens and/or the ignition switch is turned to Run, a remote activation failed message is shown on message display 77. Preferably, the message includes text that identifies the one or more reasons or conditions that prevented the successful activation.

What is claimed is:

1. A vehicle comprising:
an ignition status signal with a Run state in which an engine of the vehicle is running and an Off state in which the engine is not running;
an auxiliary heater having a Parking mode for heating a passenger cabin of the vehicle when the ignition status signal is in the Off state;
an auxiliary heater controller having a user-configurable setting for selectably entering the Parking mode when the ignition status signal enters the Off state; and
a manual interface responsive to a user to provide user commands to the auxiliary heater controller including setting commands during the Run state for determining the user-configurable setting and a cancel command during the Off state for terminating the Parking mode.

2. The vehicle of claim 1 wherein the user commands are comprised of a plurality of setting commands including a repeating command and a one-time activation command.

3. The vehicle of claim 2 wherein the setting commands further include a duration command.

4. The vehicle of claim 1 wherein the Parking mode conditionally activates the auxiliary heater depending on available energy for powering the auxiliary heater and a sufficiently cold temperature.

5. The vehicle of claim 1 wherein the Parking mode automatically terminates after a predetermined delay from entering the Parking mode.

6. The vehicle of claim 1 wherein the ignition status signal further has an Accessory state in which the engine is not running, and wherein the manual interface is responsive to the user commands during the Accessory state for determining a setpoint temperature of the auxiliary heater and a speed setting of an air blower.

7. The vehicle of claim 1 further comprising:
a message display cooperating with the manual interface for displaying, during the Parking mode, instructions for generating the cancel command.

8. The vehicle of claim 7 wherein the message display identifies the user-configurable settings during a set-up mode.

9. The vehicle of claim 1 wherein the user commands are comprised of a plurality of setting commands including a pre-scheduled time for entering the Parking mode, wherein the vehicle further comprises a message display cooperating with the manual interface, and wherein the message display identifies a next pre-scheduled time of entering the Parking mode when the Off state is detected.

10. The vehicle of claim 1 further comprising a wireless receiver configured to communicate with a user-carried remote device for remotely attempting to activate the Parking mode, wherein the vehicle further comprises a message display cooperating with the manual interface, and wherein the message display displays a fault message in the event that the Parking mode is not successfully activated.

11. The vehicle of claim 10 wherein the Parking mode conditionally activates the auxiliary heater depending on available energy for powering the auxiliary heater and a sufficiently cold temperature, and wherein the fault message identifies a condition that prevented the successful activation.

12. A method for auxiliary heating of a vehicle cabin, comprising:
manually selecting an enabled or disabled setting for automatic heater parking activation;
detecting initiation of an Off state by removal of an ignition key;
initiating the heater parking activation to heat the cabin if the enabled setting is selected;
monitoring a manual interface for a cancel command while the parking activation continues with the key removed; and
terminating parking activation upon receiving a cancel command.

13. A method of operating an auxiliary heater for a cabin of a vehicle, wherein the vehicle has an ignition controller with a Run state and an Off state, the method comprising:
manually selecting an enabled or disabled setting for automatic activation of the auxiliary heater via a manual interface;
detecting initiation of the Off state;
activating a Parking mode of the auxiliary heater upon detection of the Off state if the enabled setting is selected, wherein the Parking mode comprises:
checking for available energy for powering the auxiliary heater and a sufficiently cold temperature;

turning on the auxiliary heater to heat the cabin if a sufficient available energy and a sufficiently cold temperature are detected; and turning off the auxiliary heater after a predetermined duration;

monitoring the manual interface for a cancel command while the Parking mode and the Off state continue; and terminating the Parking mode upon receiving a cancel command.

14. The method of claim 13 further comprising:

displaying instructions for generating the cancel command on a message display during the Parking mode.

15. The method of claim 13 wherein the enabled setting further includes a repeating command wherein the Parking mode is activated for a plurality of successive Off states.

16. The method of claim 13 wherein the enabled setting further includes a one-time activation command wherein after activating the Parking mode the enabled setting is reset to the disabled setting.

17. The method of claim 13 wherein the enabled setting further includes a duration command.

18. The method of claim 13 wherein the ignition controller is comprised of an ignition switch having Run, Off, and Accessory positions, wherein the ignition controller has an Accessory state, the method further comprising the steps of:

detecting initiation of the Accessory state; and activating the Parking mode upon detection of the Accessory state if the enabled setting is selected;

wherein the manual interface is responsive to user commands during the Accessory state for determining a setpoint temperature of the auxiliary heater and a speed setting of an air blower.

19. The method of claim 13 wherein the vehicle includes a wireless receiver configured to communicate with a user-carried remote device for remotely attempting to activate the Parking mode, and wherein the vehicle further includes a message display cooperating with the manual interface, the method further comprising the step of:

displaying a fault message on the message display in the event that the Parking mode is not successfully activated.

20. The method of claim 19 wherein the fault message identifies a condition that prevented the successful activation.

* * * * *